United States Patent [19]

Goebel et al.

[11] 4,405,694

[45] Sep. 20, 1983

[54] ELECTROCHEMICAL CELL

[75] Inventors: Franz Goebel, Sudbury; Kathleen M. Kealey, Newburyport, both of Mass.

[73] Assignee: GTE Products Corporation, Stamford, Conn.

[21] Appl. No.: 333,093

[22] Filed: Dec. 21, 1981

[51] Int. Cl.³ .............................................. H01M 6/14
[52] U.S. Cl. .................................... 429/101; 429/178
[58] Field of Search ............... 429/101, 105, 196, 181, 429/178, 211, 94

[56] References Cited

U.S. PATENT DOCUMENTS

| | | | |
|---|---|---|---|
| 3,874,929 | 4/1975 | Greatbatch | 429/101 |
| 4,032,695 | 6/1977 | Coibion | 429/178 |
| 4,060,668 | 11/1977 | Goebel | 429/194 |
| 4,168,351 | 9/1979 | Taylor | 429/181 |
| 4,263,378 | 4/1981 | Feiman et al. | 429/196 |
| 4,292,346 | 9/1981 | Athearn | 429/101 |
| 4,307,162 | 12/1981 | Athearn | 429/101 |

*Primary Examiner*—Donald L. Walton
*Attorney, Agent, or Firm*—David M. Keay; Peter Xiarhos

[57] ABSTRACT

A primary electrochemical cell of a design for reducing parasitic self-discharge of the cell during storage and subsequent discharge of the cell. The cell includes a tubular porous carbon cathode structure within a metal housing of the cell and spaced from an anode structure by an insulative separator material. The carbon cathode structure and the anode structure are exposed to an electrolytic solution including a reducible soluble cathode (e.g., thionyl chloride) which is catalytically reduced during discharge of the cell at the surface of the carbon cathode structure. The anode structure includes an elongated, cylindrical, lithium member located centrally within, and spaced from, the housing, and an electrically-conductive metal assembly at the potential of the lithium electrode and connected between the lithium electrode and a feedthrough member provided in a top cover for the housing. All or portions of the electrically-conductive metal assembly, as well as the feedthrough member, are selectively covered with a sufficiently chemically-stable, catalytically-inert anti-parasitic discharge material for preventing the undesirable catalytic reduction of the soluble cathode at the surfaces of the electrically-conductive metal assembly and feedthrough member covered by the anti-parasitic discharge material.

21 Claims, 3 Drawing Figures

4,405,694

ELECTROCHEMICAL CELL

CROSS REFERENCE TO RELATED APPLICATIONS

In co-pending application Ser. No. 333,160, filed concurrently herewith in the names of Franz Goebel and Kathleen M. Kealey, and entitled "ELECTROCHEMICAL CELL", and in co-pending application Ser. No. 333,094, now U.S. Pat. No. 4,376,811 filed concurrently herewith in the name of Franz Goebel and entitled "ELECTROCHEMICAL CELL", there are disclosed and claimed electrochemical cells similar to an electrochemical cell as disclosed and claimed in the present application.

FIELD OF THE INVENTION

The present invention relates to an electrochemical cell and, more particularly, to a primary electrochemical cell of a design for reducing parasitic, self-discharge of the cell during storage and subsequent discharge of the cell.

BACKGROUND OF THE INVENTION

Primary electrochemical cells are utilized for a wide variety of applications and are commonly available in a large assortment of sizes and shapes. One well known form of an electrochemical cell is a cylindrical cell. Such a cell is disclosed in U.S. Pat. No. 4,060,668 in the name of Franz Goebel and assigned to GTE Laboratories Incorporated. The cylindrical cell as disclosed in the above-mentioned patent includes a lithium anode, a carbon current collector cathode structure, and a separator interposed between the lithium anode and the carbon current collector cathode structure. The lithium anode takes the form of a cylindrical sheet pressed against an interior wall of a metal housing of the cell, and is arranged concentrically within the housing with the carbon current collector cathode structure and the separator. The assembly of the lithium anode, carbon current collector cathode structure and separator as described hereinabove is exposed to an electrolytic solution including a reducible soluble cathode and an electrolyte solute dissolved in the reducible soluble cathode. Suitable materials for the reducible soluble cathode and the electrolyte solute are thionyl chloride and lithium tetrachloroaluminate, respectively.

In the normal discharge of a cell such as described hereinabove, the reducible soluble cathode, such as the thionyl chloride, is catalytically reduced at the surface of the carbon current collector cathode structure. This catalytic reduction results, inter alia, in the formation of a variety of reaction products within the cell and a physical and volumetric depletion of the thionyl chloride and lithium. The life span of the cell is to a large degree dictated by the amount of lithium and thionyl chloride initially present in the cell and the rate at which the thionyl chloride and lithium are depleted by electrochemical action within the cell.

As the above-mentioned catalytic reduction of the thionyl chloride takes place at the surface of the carbon current collector cathode structure, a further, and undesirable, reduction of the thionyl chloride also takes place at those metallic portions and surfaces of the cell in physical contact with the lithium anode, that is, at the potential of the lithium anode, but not covered by the lithium anode. These portions and surfaces may include, by way of example, the bottom of the metal (e.g., stainless steel) housing of the cell and metal portions of the housing above the lithium anode. This latter reduction of the thionyl chloride, which may also take place prior to normal discharge of the cell, that is, during storage of the cell, is a parasitic self-discharge reaction and can lead to an undesirable capacity loss and a premature termination of the rated life span of the cell. The rate of this self-discharge is directly proportional to the metallic area of the cell at the potential of the lithium anode, but not covered by the lithium of the anode. It is highly advantageous and desirable, therefore, that those areas of the cell at the potential of the lithium anode and at which the above-mentioned self-discharge catalytic reduction of the thionyl chloride takes place be kept to a minimum so as not to unnecessarily prematurely shorten the life span of the cell.

BRIEF SUMMARY OF THE INVENTION

In accordance with the present invention, an electrochemical cell is provided which overcomes or substantially alleviates parasitic self-discharge problems as associated with prior art cells as briefly described hereinabove.

An electrochemical cell in accordance with the present invention generally includes a metal housing, a cover for the housing having a metal electrical terminal extending therethrough, and an electrochemical system within the housing. The electrochemical system includes an electrolytic solution containing a catalytically-reducible soluble cathode, and a battery stack exposed to the electrolytic solution. The battery stack as employed within the cell generally includes a cathode structure adjacent to the metal housing and an anode structure. The cathode structure operates during discharge of the cell to catalytically reduce the soluble cathode of the electrolytic solution. The anode structure comprises a metal electrode spaced from the cathode structure and the metal housing, an electrically-conductive metal assembly at the potential of the metal electrode and connected between the metal electrode and the electrical terminal in the cover, and a chemically-stable, anti-parasitic discharge material. The anti-parasitic discharge material in accordance with the invention covers at least a portion of the metal electrically-conductive assembly and operates to prevent the catalytic reduction of the soluble cathode in the electrolytic solution at the surfaces of the portions of the metal electrically-conductive assembly covered by the anti-parasitic discharge material.

DETAILED DESCRIPTION OF THE INVENTION

Figure 1:
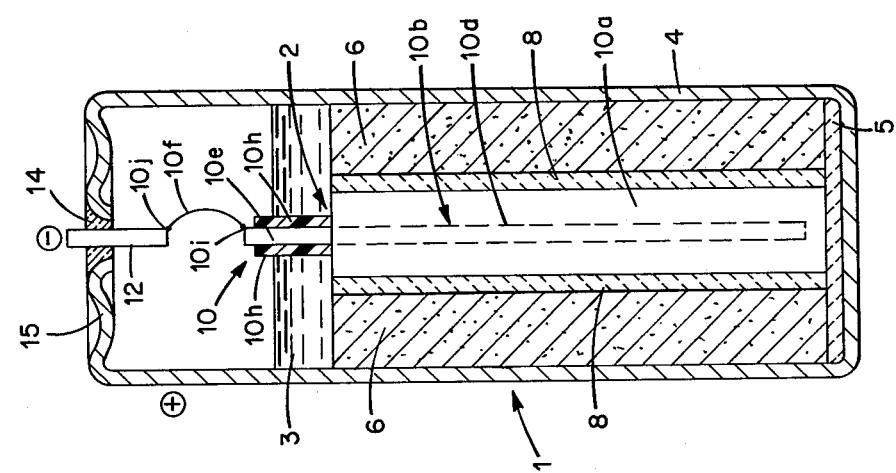
FIG. 1 is an elevational view, partly in cross section, of a primary electrochemical cell employing an anode structure of a first construction in accordance with the invention.

Referring now to FIG. 1, there is shown a primary electrochemical cell 1 in accordance with the present invention. As shown in FIG. 1, the electrochemical cell 1 includes a battery stack 2 employed together with an electrolytic solution 3 within an elongated cylindrical metal casing or housing 4 of the cell 1. The battery stack 2 and the electrolytic solution 3 collectively represent the electrochemical system of the cell. The battery stack 2 employed within the cell 1 is insulated from the housing of the cell by a suitable porous insulator 5 (e.g., of fiberglass) and generally includes a concentric arrangement of a porous carbon cathode structure 6, a thin porous separator 8, and an anode structure 10. As will be discussed in detail hereinafter, the anode structure 10 is constructed in accordance with the invention so as to minimize or substantially reduce parasitic self-discharge of the cell 1 during both storage and subsequent normal discharge of the cell.

The aforementioned porous carbon cathode structure 6 is a generally cylindrical, elongated, tubular member comprising an aggregation of discrete, semi-rigid, porous carbon conglomerates. These conglomerates generally contain a combination of carbon black, graphite, and a binder such as "Teflon". The carbon cathode structure 6 may be formed from the conglomerates into a single-piece component as shown in FIG. 1 or, alternatively, the carbon cathode structure 6 may be constructed of a preselected number of individual annular or "donut" shaped discs superimposed upon each other in a vertical stacked array to effectively form a single carbon cathode structure of essentially any desired overall length. Suitable approximate dimensions for the carbon cathode structure 6 for an AA-size cell are a length of 1.5 inches, an outside diameter of 0.5 inch, and an inside diameter of 0.25 inch. Because of the porous nature of the constituent components of the conglomerates used to form the carbon cathode structure 6, the carbon cathode structure 6 has a resultant network of electrolyte-conducting channels formed therein whereby the carbon cathode structure 6 can be readily permeated by the electrolytic solution 3. Techniques for producing the conglomerates employed by the carbon cathode structure 6 are described in U.S. Pat. No. 4,161,063 to which reference may be made for specific details.

The aforementioned porous separator 8 is disposed intermediate to the carbon cathode structure 6 and the anode structure 10 and is used to electrically isolate the carbon cathode structure 6 from the anode structure 10. The separator 8 typically takes the form of a cylindrical sheet of a standard electrically-nonconductive material such as fiberglass.

The anode structure 10 as utilized within the cell 1 is located centrally within the cell 1 and, as shown in FIG. 1, generally includes a solid, elongated cylindrical metal electrode 10a; a solid, elongated, electrically-conductive metal rod 10b having a major portion 10d thereof completely embedded within the electrode 10a and a portion 10e extending outwardly from the electrode 10a; a thin, flexible, electrically-conductive metal jumper element 10f connected to the exposed end of the portion 10e of the rod 10b; and an anti-parasitic discharge material 10h disposed on the portion 10e of the rod 10b.

The electrode 10a of the anode structure 10 is typically of an oxidizable active alkali metal such as lithium, and the rod 10b and the jumper element 10f used with the electrode 10a are typically of nickel. Suitable approximate dimensions for the electrode 10a and the rod 10b are a length of 1.5 inches and a diameter of 0.25 inch for the electrode 10a, and a length of 1.6 inches and a diameter of 0.040 inch for the rod 10b. The jumper element 10f may take the form of a wire or flat ribbon and may be secured to the rod 10b by welding an end 10i thereof to the exposed end or termination of the portion 10e of the rod 10b. The other end of the jumper element 10f, designated 10j in FIG. 1, is secured, as by welding, to a standard, cylindrical, hollow, metal (e.g., nickel) feedthrough member 12 passing through a standard insulative glass or ceramic-to-metal seal 14 provided within an hermetically sealed metal cap or cover 15 of the cell.

The jumper element 10f, by virtue of its non-rigid flexible nature and small thickness, e.g., 0.005–0.015 inch, serves to absorb any shock or vibration to which the cell 1 might be exposed, thereby to prevent a break in the physical and electrical connection between the rod 10b and the feedthrough member 12, and also to minimize the possibility of physical damage (e.g., breakage) to the glass or ceramic-to-metal seal 14 due to such factors as shock and vibration. The hollow nature of the feedthrough member 12 as described hereinabove serves to permit the introduction of the electrolytic solution 3 into the cell 1 for permeating the porous components of the battery stack 2. Following the filling of the cell with the electrolytic solution 3, the number 12 is closed at its outside opening, as by welding. The feedthrough member 12 thereupon serves as the negative terminal of the cell 1. The housing 4 of the cell 1, which may be of stainless steel and against which the aforedescribed carbon cathode structure 6 physically abuts, serves as the positive terminal of the cell 1.

A suitable and preferred electrolytic solution 3 which may be used with the above-described cell 1 is a cathodelectrolyte solution including a reducible soluble cathode, such as thionyl chloride, and an electrolyte solute, such as lithium tetrachloroaluminate, dissolved in the thionyl chloride.

The aforementioned anti-parasitic discharge material 10h is employed to minimize or substantially reduce parasitic self-discharge of the cell 1 and serves, in a manner to be described more fully hereinafter, to minimize or substantially reduce the amount of exposed metallic surface area of the anode structure 10 at which undesirable parasitic self-discharge of the cell 1 can take place, during both storage and subsequent discharge of the cell 1. To this end, the material 10h is selected to be a sufficiently stable, catalytically inert material which does not react chemically in an adverse or harmful fashion with the particular electrolytic solution 3 or reaction products produced during discharge of the cell. Suitable substances which have the desirable chemical characteristics and which may be used for the anti-parasitic discharge material 10h include glass (e.g., silicon dioxide), a ceramic (e.g., aluminum oxide), lithium, and plastics such as ethylene chlorotrifluoroethylene, or ECFE ("Halar"), and a copolymer of ethylene and polytetrafluoroethylene ("Tefzel"). A suitable thickness for the anti-parasitic discharge material 10h is 0.003 inch.

In the operation of the cell 1 as described hereinabove, specifically, during normal discharge of the cell 1, the reducible soluble cathode, namely, the thionyl chloride, is catalytically reduced principally at the surface of the carbon cathode structure 6 as defined by the aggregation of porous carbon conglomerates. This catalytic reduction results, inter alia, in the formation of a variety of reaction products within the cell and, as determined by the rate of this catalytic reduction, the gradual depletion of the metal, e.g., lithium, of the electrode 10a and the thionyl chloride. The complete depletion or consumption of either one or both of these consumable components determines the end of the useful life of the cell. Thus, it is highly desirable to extend the period of time over which the depletion of the lithium and thionyl chloride takes place so that capacity losses are minimized and a long life for the cell is reasonably guaranteed. Consistent with this objective, it is important and desirable to minimize parasitic self-discharge activity at surfaces or areas other than the surface area of the carbon cathode structure 6.

In accordance with the present invention, the extent of parasitic self-discharge of the cell 1 is minimized or substantially reduced by: (1) centrally locating and positioning the lithium electrode 10a of the anode structure 10 relative to the other components of the cell 1 such that as little of the lithium electrode 10a as possible is in physical contact with metal parts or portions of the cell (such as the housing 4) at which the parasitic self-discharge activity might take place; and (2) utilizing the anti-parasitic discharge material 10h on the portion 10e of the rod 10b so as to minimize the extent of the parasitic self-discharge activity at the surface of the portion 10e of the rod 10b. It will be noted that a very small part of the portion 10e of the rod 10b, specifically, at the exposed end thereof, is necessarily left uncovered by the anti-parasitic discharge material 10h so that the necessary physical and electrical connection of the jumper element 10f to the rod 10b can be effected.

Figure 3:
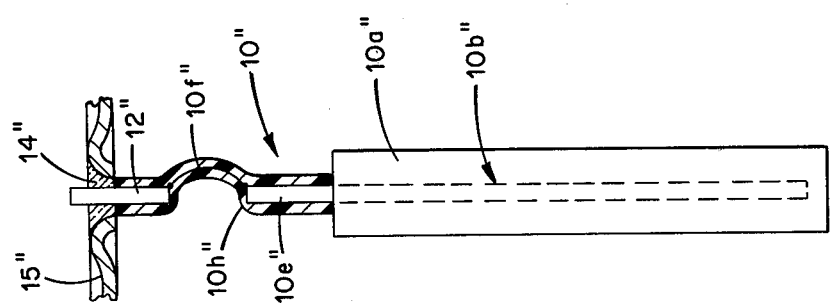
FIGS. 2 and 3 are elevational views, partly in cross section, of anode structures of alternative construction which may be employed in the electrochemical cell of FIG. 1 in accordance with the invention.
Figure 2:
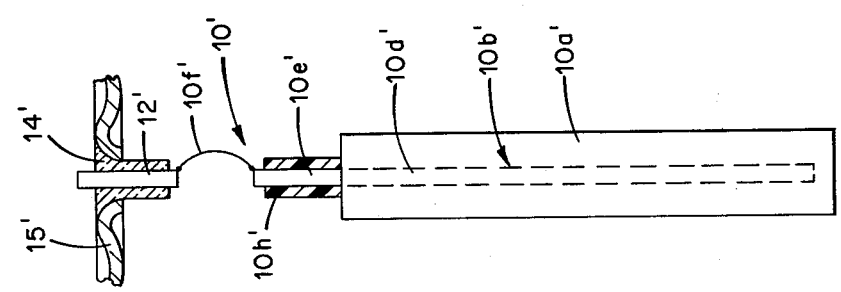

If the cell 1 as described hereinabove is to be stored and/or subsequently used in a vertical upright position, it is not generally necessary that the jumper element 10f or the feedthrough member 12 be covered with the anti-parasitic discharge material 10h since the electrolytic solution 3 (containing the reducible thionyl chloride) is generally at a level below the jumper element 10f and the feedthrough member 12, and this level is lowered by depletion of the thionyl chloride during normal discharge of the cell. However, in the event a vertical storage and/or operating position for the cell cannot be guaranteed, as is usually the case, it is normally desirable to further reduce the amount of surface area metal at which parasitic self-discharge activity can possibly take place. In such an instance, an anode structure such as shown at 10' in FIG. 2 can be utilized. In the anode structure 10' of FIG. 2, the glass or ceramic-to-metal seal, designated 14', is initially formed in a cap or cover 15' of the cell so as to cover a greater part of a feedthrough member 12' than is shown in FIG. 1. The other parts of the anode structure 10', shown with single primes in FIG. 2, are the same as in FIG. 1. FIG. 3 illustrates another variation of an anode structure, designated at 10" in FIG. 3, in which all of the metal parts directly associated with a lithium electrode 10a", including a portion 10e" of a metal rod 10b", a metal jumper element 10f", a feedthrough member 12', and all associated welds, are all covered with an anti-parasitic discharge material 10h" such as lithium, "Halar" or "Tefzel". The amount of anti-parasitic discharge material 10h" deposited on the aforementioned parts 10e", 10f" and 12" (and associated welds), and especially the jumper element 10f", is normally selected to be of a small thickness (e.g., approximately 0.003 inch) so as not to impair or destroy the flexible character of the jumper element 10f". It is for this reason that glass or ceramic materials are less suitable for use on the jumper element 10f".

While there have been described what are considered to be preferred embodiments of the invention, it will be apparent to those skilled in the art that various changes and modifications may be made therein without departing from the invention as called for in the appended claims.

What is claimed is:

1. An electrochemical cell comprising;

a metal housing and a cover for said housing, said cover having a metal electrical terminal extending therethrough; and an electrochemical system within the metal housing and including an electrolytic solution and a battery stack exposed to the electrolytic solution, said electrolytic solution including a catalytically-reducible soluble cathode, and said battery stack comprising:

a cathode structure adjacent to the metal housing and operative during discharge of the cell to catalytically reduce the soluble cathode of the electrolytic solution; and an anode structure comprising:

a metal electrode spaced from the cathode structure and the metal housing;

a metal electrically-conductive assembly at the potential of the metal electrode and connected between the metal electrode and the electrical terminal in the cover; the metal electrically-conductive assembly comprising:

an electrically-conductive metal conductor in physical and electrical contact with the metal electrode and having a first portion disposed within the metal electrode and a second portion extending outwardly from the metal electrode; and an electrically-conductive metal jumper element physically and electrically connected between the second portion of the metal conductor and the electrical terminal in the cover; and a chemically-stable, anti-parasitic discharge material covering at least a portion of the metal electrically-conductive assembly and operative to prevent the catalytic reduction of the soluble cathode in the electrolytic solution at the surfaces of the portions of the metal electrically-conductive assembly covered by the anti-parasitic discharge material.

2. An electrochemical cell in accordance with claim 1 wherein:

the anti-parasitic discharge material covers the metal conductor of the electrically-conductive assembly.

3. An electrochemical cell in accordance with claim 2 wherein:

the reducible soluble cathode in the electrolytic solution is thionyl chloride;

the cathode structure comprises an aggregation of porous carbon conglomerates permeable by the electrolytic solution and defining a surface area for the catalytic reduction of the thionyl chloride in the electrolytic solution;

the metal electrode includes an alkali metal; and the anti-parasitic discharge material is selected from the group consisting of glass, a ceramic, a metal, ethylene chlorotrifluoroethylene, and a copolymer of ethylene and polytetrafluoroethylene.

4. An electrochemical cell in accordance with claim 3 wherein:

the alkali metal of the metal electrode is lithium; and the metal of the group of anti-parasitic discharge materials is lithium.

5. An electrochemical cell in accordance with claim 8 wherein:
the metal housing is an elongated cylindrical housing;
the carbon cathode structure is an elongated, cylindrical, tubular member;
the lithium electrode is an elongated, cylindrical member;
the metal conductor is an elongated, solid, electrically-conductive rod having a first portion within the elongated cylindrical lithium electrode and a second portion extending outwardly from the elongated cylindrical lithium electrode; and
the jumper element is a flexible, electrically-conductive metal element connected between the second portion of the solid rod and the electrical terminal in the cover.

6. An electrochemical cell in accordance with claim 5 wherein:
the lithium electrode is spaced from the cathode structure and the metal housing of the cell by a porous insulative separator material.

7. An electrochemical cell in accordance with claim 1 wherein:
the anti-parasitic discharge material covers both the metal conductor and the jumper element.

8. An electrochemical cell in accordance with claim 7 wherein:
the reducible soluble cathode in the electrolytic solution is thionyl chloride;
the cathode structure comprises an aggregation of porous carbon conglomerates permeable by the electrolytic solution and defining a surface area for the catalytic reduction of the thionyl chloride in the electrolytic solution;
the metal electrode includes an alkali metal; and
the anti-parasitic discharge material is selected from the group consisting of a metal, ethylene chlorotrifluoroethylene, and a copolymer of ethylene and polytetrafluoroethylene.

9. An electrochemical cell in accordance with claim 8 wherein:
the alkali metal of the metal electrode is lithium; and
the metal of the group of anti-parasitic discharge materials is lithium.

10. An electrochemical cell in accordance with claim 9 wherein:
the metal housing is an elongated cylindrical housing;
the carbon cathode structure is an elongated, cylindrical, tubular member;
the lithium electrode is an elongated, cylindrical member;
the metal conductor is an elongated, solid, electrically-conductive rod having a first portion within the elongated cylindrical lithium electrode and a second portion extending outwardly from the elongated cylindrical lithium electrode; and
the jumper element is a flexible, electrically-conductive metal element connected between the second portion of the solid rod and the electrical terminal in the cover.

11. An electrochemical cell in accordance with claim 1 wherein:
the metal electrical terminal in the cover is an elongated cylindrical terminal; and
the cover of the cell further includes an insulative seal surrounding the elongated metal electrical terminal and isolating the terminal from the rest of the cover, said seal covering essentially the entire terminal except for a region to which the electrically-conductive assembly is connected.

12. An electrochemical cell in accordance with claim 11 wherein:
the anti-parasitic discharge material covers the metal conductor.

13. An electrochemical cell in accordance with claim 12 wherein:
the reducible soluble cathode in the electrolytic solution is thionyl chloride;
the cathode structure comprises an aggregation of porous carbon conglomerates permeable by the electrolytic solution and defining a surface area for the catalytic reduction of the thionyl chloride in the electrolytic solution;
the metal electrode includes an alkali metal; and
the anti-parasitic discharge material is selected from the group consisting of glass, a ceramic, a metal, ethylene chlorotrifluoroethylene, and a copolymer of ethylene and polytetrafluoroethylene.

14. An electrochemical cell in accordance with claim 13 wherein:
the metal housing is an elongated cylindrical housing;
the carbon cathode structure is an elongated, cylindrical, tubular member;
the alkali metal electrode is an elongated, cylindrical lithium electrode;
the metal conductor is an elongated, solid, electrically-conductive rod having a first portion within the elongated cylindrical lithium electrode and a second portion extending outwardly from the elongated cylindrical lithium electrode;
the jumper element is a flexible, electrically-conductive metal element connected between the second portion of the solid rod and the electrical terminal in the cover; and
the metal of the group of anti-parasitic discharge materials is lithium.

15. An electrochemical cell in accordance with claim 11 wherein:
the anti-parasitic discharge material covers both the metal conductor and the jumper element.

16. An electrochemical cell in accordance with claim 15 wherein:
the reducible soluble cathode in the electrolytic solution is thionyl chloride;
the cathode structure comprises an aggregation of porous carbon conglomerates permeable by the electrolytic solution and defining a surface area for the catalytic reduction of the thionyl chloride in the electrolytic solution;
the metal electrode includes an alkali metal; and
the anti-parasitic discharge material is selected from the group consisting of a metal, ethylene chlorotrifluoroethylene, and a copolymer of ethylene and polytetrafluoroethylene.

17. An electrochemical cell in accordance with claim 16 wherein:
the metal housing is an elongated cylindrical housing;
the carbon cathode structure is an elongated, cylindrical, tubular member;
the alkali metal electrode is an elongated, cylindrical, lithium electrode;
the metal conductor is an elongated, solid, electrically-conductive rod having a first portion within the elongated cylindrical lithium electrode and a second portion extending outwardly from the elongated cylindrical lithium electrode;

the jumper element is a flexible, electrically-conductive metal element connected between the second portion of the solid rod and the electrical terminal in the cover; and the metal of the group of anti-parasitic discharge materials is lithium.

18. An electrochemical cell comprising;

a metal housing and a cover for said housing, said cover having an elongated metal electrical terminal extending therethrough into the housing; and an electrochemical system within the metal housing and including an electrolytic solution and a battery stack exposed to the electrolytic solution, said electrolytic solution including a catalytically-reducible soluble cathode, and said battery stack comprising:

a cathode structure adjacent to the metal housing and operative during discharge of the cell to catalytically reduce the soluble cathode of the electrolytic solution; and an anode structure comprising:

a metal electrode spaced from the cathode structure and the metal housing;

a metal electrically-conductive assembly at the potential of the metal electrode and connected between the metal electrode and the elongated electrical terminal in the cover; the metal electrically-conductive assembly comprising:

an electrically-conductive metal conductor in physical and electrical contact with the metal electrode and having a first portion disposed within the metal electrode and a second portion extending outwardly from the metal electrode; and an electrically-conductive metal jumper element physically and electrically connected between the second portion of the metal conductor and the elongated terminal in the cover; and a chemically-stable, anti-parasitic discharge material disposed on the metal electrically-conductive assembly and the elongated terminal in the cover and operative to prevent the catalytic reduction of the soluble cathode in the electrolytic solution at the surfaces of the metal electrically-conductive assembly and elongated terminal covered by the anti-parasitic discharge material.

19. An electrochemical cell in accordance with claim 18 wherein:

the reducible soluble cathode in the electrolytic solution is thionyl chloride; and the cathode structure comprises an aggregation of porous carbon conglomerates permeable by the electrolytic solution and defining a surface area for the catalytic reduction of the thionyl chloride in the electrolytic solution.

20. An electrochemical cell in accordance with claim 19 wherein:

the anti-parasitic discharge material is selected from the group consisting of a metal, ethylene chlorotrifluoroethylene, and a copolymer of ethylene and polytetrafluoroethylene.

21. An electrochemical cell in accordance with claim 20 wherein:

the metal housing is an elongated cylindrical housing;

the carbon cathode structure is an elongated, cylindrical, tubular member;

the alkali metal electrode is an elongated, cylindrical, lithium electrode;

the metal conductor is an elongated, solid, electrically-conductive rod having a first portion within the elongated cylindrical lithium electrode and a second portion extending outwardly from the elongated cylindrical lithium electrode;

the jumper element is a flexible, electrically-conductive metal element connected between the second portion of the solid rod and the electrical terminal in the cover; and the metal of the group of anti-parasitic discharge materials is lithium.

* * * * *